United States Patent

[11] 3,571,799

| [72] | Inventors | Charles W. Coker, Jr;<br>Harry W. Johnson; Robert A. Peterson, Los Gatos; John N. Stallard, San Jose, Calif. |
|---|---|---|
| [21] | Appl. No. | 851,976 |
| [22] | Filed | Aug. 21, 1969 |
| [45] | Patented | Mar. 23, 1971 |
| [73] | Assignee | International Business Machines Corporation<br>Armonk, N.Y. |

[54] DATA TRANSMISSION TERMINAL
11 Claims, 7 Drawing Figs.
[52] U.S. Cl........................................ 340/152,
179/2, 235/61.11, 340/149, 340/174.1
[51] Int. Cl........................................ G11b 5/00,
H04m 11/00, H04a 9/00
[50] Field of Search........................................ 340/152,
174.1, 149; 235/61.11; 179/2 (CA), 2 (DP), 2 (R)

Cited
UNITED STATES PATENTS
3,281,796 10/1966 Neel.......................... 340/152UX
3,359,369 12/1967 Di Iorio et al................. 179/2DP

*Primary Examiner*—Donald J. Yusko
*Attorneys*—Hanifin and Jancin and Shelley M. Beckstrand ABSTRACT: A credit authorization terminal for sensing identification data from a magnetic credit card and transmitting the same to a central processor over telephone lines. Also, a keyboard for transmitting variable transaction data. Magnetic data is recorded on the credit card in two modes, only one of said modes being intelligible to the terminal read head. Also, a terminal identification magnetic card. Credit verification or authorization is by voice answerback.

INVENTORS
CHARLES W. COKER, Jr.
HARRY W. JOHNSON
ROBERT A. PETERSON
JOHN N. STALLARD

BY
Shelley M Beikstrand
ATTORNEY 3,571,799

1

DATA TRANSMISSION TERMINAL

BACKGROUND OF THE INVENTION

The invention relates to a terminal for use in a credit authorization, data collection, or other system where identification and transaction data is transmitted to a central computer for processing.

A number of systems have been proposed for interrogating a central location for authorizing the extension of credit to a potential customer at a remote point of sale. These often require that the clerk key in a great amount of detailed identification and transaction data. This requires a relatively large amount of time, during which time the central computer and the telephone communication links are reserved to the transaction with corresponding high cost.

In some cases, the point of sale terminal has been provided with means for reading punched holes in the identification card. However, because of the very little amount of data which may be punched or embossed on a standard "Mr." credit card, the operator must still key in a significant amount of data. Also, mechanical hole or bar code-sensing devices are relatively unreliable and slow in operation.

With the proliferation of credit cards, another great need is to permit a single card to serve two industries, such as both the travel and the entertainment or the retail industries. A major problem becomes, then, making data on the same card applicable to one industry or user not available to the other. Also, with one user possibly requiring a relatively large amount of identification data and another relatively little, the art is in need of means for combining both high density and low density data.

Credit authorization terminals in the prior art present a number of additional disadvantages. Some of the more serious are that in addition to the time and skill required to key-in a large amount of identification and transaction data, the high probability of keying-in erroneous data; and the possibility of fraud or collusion—the use of stolen or counterfeit cards or the deliberate keying-in or erroneous data by the clerk.

As a step toward the prevention of collusion, it is desirable to identify the point of sale or even the clerk initiating the credit verification inquiry. In order to be effective, however, prior art identifying methods have had to be different from that utilized for identifying the customer, requiring additional logic in the terminal.

In order to avoid the preparation of counterfeit cards, it is desirable to provide cards where the identification data may not be written or altered except with machinery or processes which are exceedingly difficult to reproduce. In addition, however, the card must be capable of being sensed in a low cost and reliable terminal which is still highly sensitive to counterfeit cards.

It is therefore an object of the invention to provide an improved terminal for interrogating a central location for authorization to extend credit to a potential customer.

It is a further object of our invention to greatly reduce the time required for transmission of the authorization request and at the same time greatly increase the amount of data which may be provided in the request.

It is a further object of the invention to provide means for transmitting customer identification data which may not be altered by the clerk.

It is a further object of the invention to provide means for sensing, at a given point of sale, only that portion of the identification data available on the credit card which pertains to the particular business or transaction.

It is a further object of the invention to provide means for identifying the terminal which requires a minimum amount of additional logic and circuitry.

It is a further object of the invention to provide a credit authorization terminal with improved ability to reject a counterfeit identification card.

2

SUMMARY OF THE INVENTION

The invention, therefore, provides a novel terminal for transmitting identification and transaction data to a central processor. A first or customer identification card has encoded in said stripe customer data in at least one of two modes. A second identification card, for identifying the point of sale or clerk, has a magnetic stripe encoded with information in one of said two modes. A magnetic transducer is mounted on a carriage and oriented so as to sense the data in the mode recorded on the second identification card. Means are provided for holding said cards with their respective magnetic stripes colinear, and means are also provided for causing relative motion between the transducer and the card such that the magnetic data of the second card, and the magnetic data on the first card encoded in the same mode as that of the second card is serially sensed and transmitted to the central computer.

The foregoing and other objects, features and advantages of the invention will be apparent from the following more particular description of a preferred embodiment of the invention, as illustrated in the accompanying drawings.

DESCRIPTION

Figure 1:
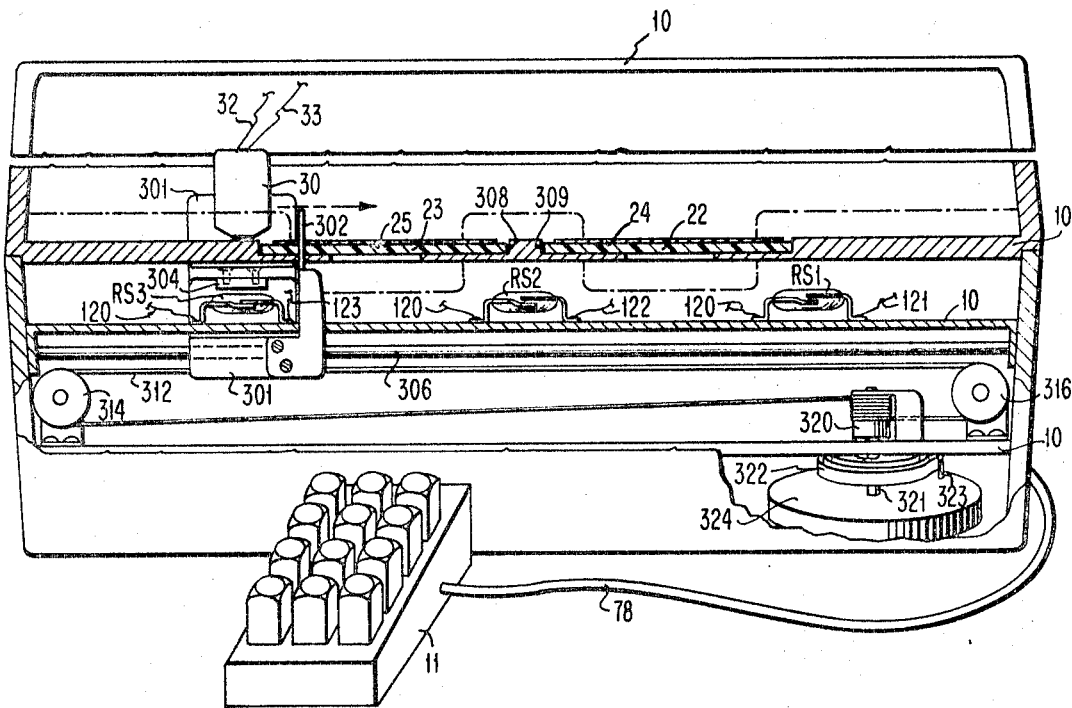
FIG. 1 is a diagrammatic view of the credit authorization terminal of the invention.

Referring now to the drawings, a more detailed description will be given of one embodiment of the invention for transmitting identification and transaction data to a central processor.

TERMINAL CARD READER AND KEYBOARD

Referring first to FIG. 1, the means for sensing the information on magnetic stripes 24 and 25 of identification cards 22 and 23 will be described.

Secured to base 10 is shaft 306 upon which is mounted carriage 301. Mounted on carriage 301 is magnetic transducer 30 with its read gap aligned to sense data in one mode: either the high density data 26, or the low density data 27 on magnetic track 25 of identification card 23, as is described more fully hereafter with respect to FIGS. 2A and 2B. Also secured on carriage 301 is a permanent magnet 304 and handle 302.

Herein, the means provided for holding the two cards 22 and 23 with their respective magnetic tracks 24 and 25 colinear comprise customer identification card holder 308 and terminal identification card holder 309, both holders being part of base 10.

Means are provided for causing relative motion between transducer 30 and magnetic cards 22 and 23. Cable 312 is attached to carriage 301 at both ends, and is wound through pulleys 314 and 316 upon drum 320, which is secured by shaft 321 to spring 322 and governor 324. The other end of spring 321 is fastened to base 10 by pin 323.

The reed switch gating means for permitting transmission of data sensed by transducer 30 only when said transducer is scanning the data area of the magnetic tracks comprise the magnet 304 and reed switches RS1, RS2, and RS3. Mounted on base 10 between holders 308 and 309 is reed switch RS2, and mounted on base 10 near opposite ends of holders 308 and 309 are reed switches RS1 and RS3.

When not in use, carriage 301 is positioned such that permanent magnet 304 is adjacent to reed switch RS1. In this, the home position, reed switch RS1 is closed such that line 121 is shorted to ground along line 120. When it is desired to read the magnetic data on cards 22 and 23, the operator pushes on handle 302 to move carriage 301 along rail 306 to the left, or cocked position, as shown in FIG. 1. This movement of carriage 301 to the left causes cable 312 to wind spring 322 through drum 320, thereby storing energy in said spring 322. In the cocked position shown, permanent magnet 304 closes reed switch RS3, shorting line 123 to ground along line 120. When the operator releases handle 302 on carriage 301, spring 322 drives said carriage 301 through cable 312 towards the right, as shown in FIG. 1, at a speed controlled by governor 324. As permanent magnet 304 clears reed switch RS3, the data in stripe 25 of card 23 sensed by head 30 is transmitted. As head 30 reaches the end of magnetic stripe 25 permanent magnet 304 actuates reed switch RS2, shorting line 122 to ground through line 120, which blocks data transmission as will be described later. As permanent magnet 304 clears reed switch RS2, head 30 senses the magnetic data in magnetic stripe 24 on card 22. Upon reaching the end of stripe 24, or home position, the carriage 301 is positioned such that magnet 304 actuates reed switch RS1, which shorts line 121 to ground through line 120 and thereby signals the end of transmission.

The speed at which carriage 301 travels determines the transmission rate of card-sensed data over the telephone lines. For high and low density data, slower and higher speeds respectively are required for a given transmission rate. This may be adjusted by changing the characteristics of governor 324. An alternate method for controlling the transmission rate, as will be apparent hereafter, is to vary the information content of each transmitted character. That is, instead of the four bit character described in FIGS. 5 and 6 for, say, low density data, increase the character content to, say, seven bits (with obvious changes required in the electronics).

MAGNETIC ENCODED IDENTIFICATION CARDS

Figure 2A:
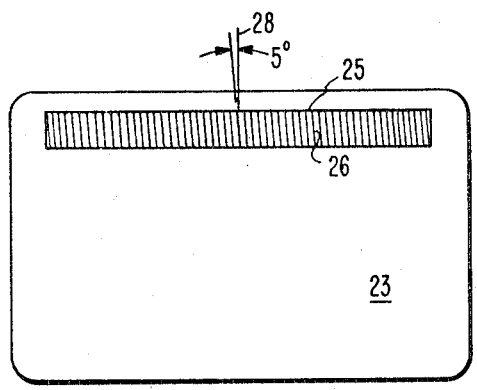
FIGS. 2A and 2B are representations of the credit card for use in the terminal of the invention showing high density and dual density recordings respectively.
Figure 2B:
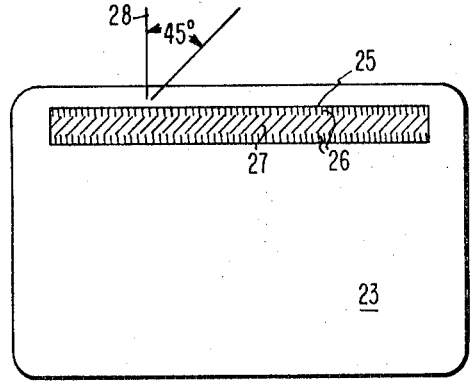

Referring now to FIGS. 2A and 2B, the identification cards 22 and 23 for identifying the potential customer and the clerk or point of sale will be next described.

According to one aspect of the invention, identification card 23 carries a magnetic stripe 25. The magnetic stripe 25 is placed on card 23 by a hot stamp transfer-coating method, a wet stripe coating method, vacuum deposition, or other technique employed by those familiar with the art of preparing magnetic coatings on a substrate.

Identification data in two modes may be recorded in the magnetic stripe. For example, high density data 26 and low density data 27 are both recorded on the same magnetic stripe 25 by first recording the high density data in a saturation recording of double frequency data (f/2f) with the recording head gap aligned at −5° with respect to a line 28 in the plane of the card perpendicular to the longitudinal axis of the stripe 25. The second track of low density data 27 is recorded over the center half of the first track with the recording head gap aligned at +45°. The angle between these recordings causes the second track of data 27 to be essentially transparent to the magnetic head for reading the first track 26. Similarly, that same angle between the recordings causes the first track of data 26 to be essentially transparent to the magnetic read head of the second track of data 27.

According to one aspect of the invention, each customer is provided with an identification card with identification data recorded in either a first or second mode as above described, or in both.

Similarly, an identification card is provided to identify the terminal 10 at each point of sale, or the sales clerk or terminal operator, with identification data recorded in the magnetic stripe in one of the two modes.

Mounted on carriage means 301 is a magnetic transducer 30 oriented so as to sense the data in the terminal identification card 22. For example, for a terminal designed to sense the low density data 27, the read head 30 of terminal 10 has its read gap oriented at +45°. The terminal identification card 22 has its recording oriented at the same angle, or +45°. The customer card 33 is placed in terminal 10 and only that data recorded therein at the +45° angle is sensed as read head 30 scans both identification cards 22 and 23.

It is not essential that the second track 27 to be recorded down the center of track 26, but may be placed to one side or the other. Also, it is not essential that dual density recording in saturation mode (f/2f) be employed for each track, as will be apparent to those skilled in the art. One advantage of recording the low density track 27 down the center of high density track 26 is that in this case for high density data 26 the tolerance on read head 30 gap alignment is tighter, requiring the read gap to be more precisely aligned making it more difficult to prepare a counterfeit high density card.

GENERAL TERMINAL LOGIC DIAGRAM

Figure 3:
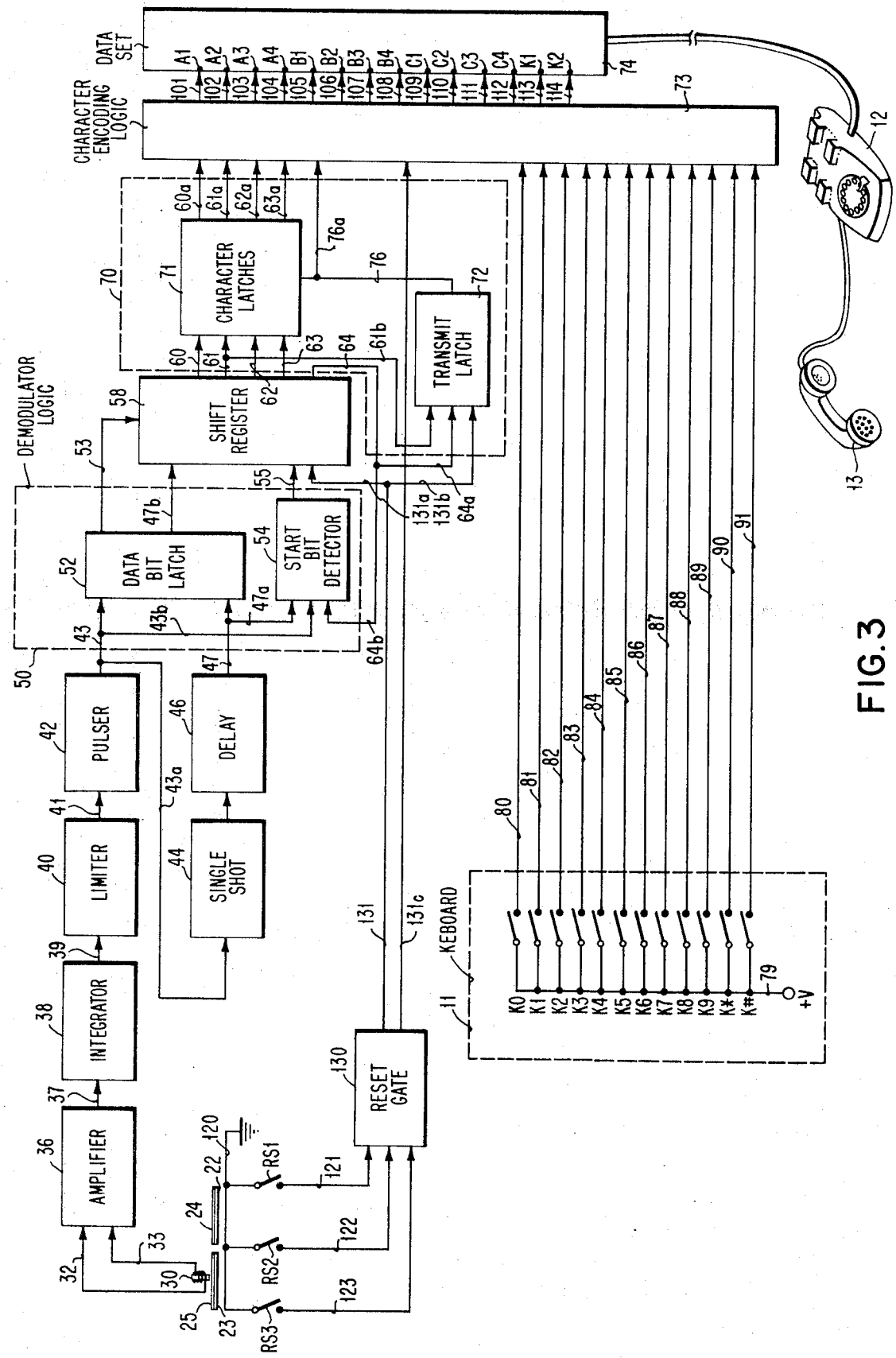
FIG. 3 is an overall system logic diagram of a preferred embodiment of the invention.
Figure 4:
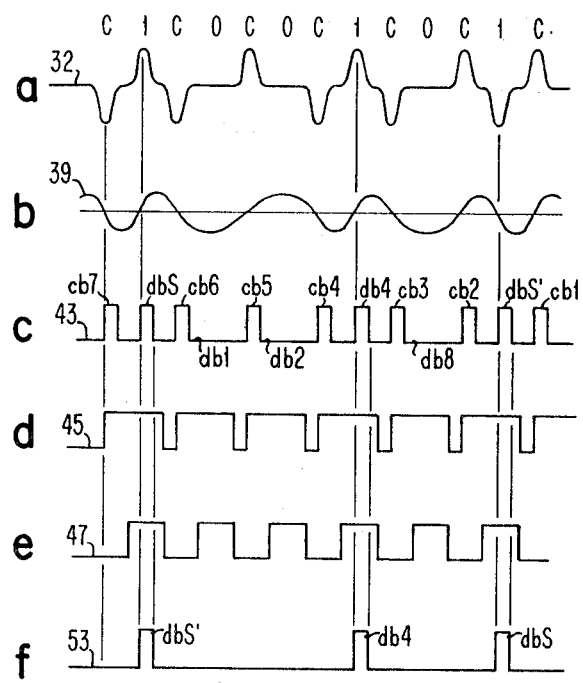
FIG. 4 is a representation of exemplary signals at selected locations in the various logic diagrams.

Referring now to FIG. 3, in connection with FIG. 4, a description will be given of the general flow diagram of a preferred embodiment of a terminal means for transmitting via telephone lines to a central computer information from a keyboard and the magnetic stripe on an identification card.

Keyboard means are provided for transmitting transaction data; that is, data which varies from one transaction to another, not conveniently includable in the card. Herein, keyboard 11 comprises a plurality of keys numbered key K0 through K9, K0 and K*. The key status (open or closed) is signaled along the applicable line 80 through 91 to character encoding logic 73. In character encoding logic 73, as will be more fully explained, the key status is coded into a 3/14 code, for example, for presentation to data set 74 for transmission of the tone code to the central computer over switched voice grade telephone lines.

The means provided for transmitting to the central processor information sensed by read head 30 from the magnetic track 25 on card 23 and the magnetic track 24 on card 22 will next be described. After cocking head 30 to the leftmost position as shown in FIG. 3, the head is released and travels to the right, sensing the magnetic information in the magnetic tracks 24 and 25. Head 30 is connected to amplifier 36, which is a differential amplifier with common mode rejection, along lines 32 and 33. The difference in signals between lines 32 and 33 as head 30 scans the magnetic tracks 25 and 24 is shown as signal $a$ in FIG. 4. The head output is amplified in amplifier 36 and introduced along 37 into integrator 38. The output of integrator 38 is signal $b$, where each zero crossing corresponds to a peak of signal $a$, and is fed into limiter 40 along line 39. The output of limiter 40 is fed along line 41 to pulser 42, the output of which appears on line 43 as signal $c$, said signal giving a positive pulse for each magnetization transition of the double frequency encoded data and clock bits appearing on the card, or each pulse peak of the read back signal $a$. Signal $c$ is fed along lines 43 and 43a to single shot 44, which gives signal $d$ as output on line 45. Single shot 44 gives a positive output for a period of time following each clock bit in signal 43 which extends beyond the occurrence of a data bit which may follow said clock bit. Delay 46 generates from the signals on line 45 a window signal $e$ appearing on line 47. Each positive going pulse in signal $e$ commences at a time following the beginning of the single shot output from single shot 44, which time is less than the period until the beginning of the next data bit, if any. Thus, the combination of single shot 44 and delay 46 generate a window waveform $e$ on line 47, which is negative whenever a clock bit occurs and positive whenever a data bit occurs. Signal $c$, containing positive going pulses for each clock and data bit, and the window signal $e$, are fed along lines 43 and 47, respectively, into data bit latch 52 and start bit detector 54 of the demodulator logic 50. The output of delay 46 is also inverted in data bit latch 52 and then fed to shift register 58 along line 47b. The function of data bit latch 52 is to strip the clock bits from signal c on line 43 and introduce into shift register 58 just data bits, as shown in signal f, along line 53. Assume a five-bit character comprising bits of value start (dbs'), 8 (db8), 4 (db4), 2 (db2) and 1 (db1), as shown in FIG. 4, signals c and f. Said bits are introduced into shift register 58 along line 53 and shifted respectively in order to lines 60, 61, 62, 63 and 64. As the start bit dbs' appears at line 64, it is fed back along line 64b to start bit detector 54. The function of start bit detector 54 is to detect the appearance of the start bit (dbs') in the fifth position and of the remaining data bits db1, db2, db4, and db8 in the other positions of the shift register and signal that occurrence to shift register 58 along line 55. As will be more fully explained hereinafter, when none of the reed switches RS1 through RS3 are closed, a positive signal appears on line 131 from reset gate 130 and is fed along line 131 and 131a into shift register 58. Upon simultaneous occurrence of positive signals along line 131a and 55, the content of shift register 58 is fed along line 60 through 63 into character latch 71 of transmit timing latches 70. In character latch 71, the character is retained for a period of time determined by transmit latch 72. During this time, the information contained in character latch 71 along lines 60a through 63a is transmitted to character encoding logic 73. Upon appearance of the start bit dbs'' of the following character on line 61, transmit latch 72 is reset and transmit line 76 signals character latch 71 to clear and terminate the transmission of the first character. Upon appearance of said start bit dbs'' of the following character in the fifth position of shift register 58 such that said signal appears on lines 64 and 64a, transmit latch 72 signals to character latch 71 to store the character contained in shift register 58. The other input to transmit latch 72 appears along line 131b and 131 from reset gate 130, such that character latch 71 will be signaled to transmit information only during those periods when reed switches RS1 through RS3 are not closed, signifying that read head 30 is scanning the data track and sensing good data instead of generating noise such as expected when said head 30 is scanning between cards or near the extreme ends of the head travel.

As will be more fully explained hereinafter in connection with FIG. 6, herein the output of character latch 71 appearing along lines 60a through 63a is encoded by character encoding logic 73 and fed along lines 101—112 to key contacts A1 through DCM of a Western Electric 401E Dataset for the generation of tone codes for transmission over telephone lines to the central data processor.

The identifying means for distinguishing key data from card sensed data comprises character encoding logic 73, wherein different multitone codes are generated for the same character values. Thus, the operator may not, by pushing key K8 transmit a multitone code which will be interpreted at the central processor as the binary character 1000, or decimal 8, from the magnetic identification card.

Also attached to data set 74 is handset 13 through phone 12 for receiving voice or tone answerback from the central processor in response to the inquiry transmitted via the keyboard 11 and identification cards 23 and 22.

SERIAL TO PARALLEL CONVERTER

Figure 5:
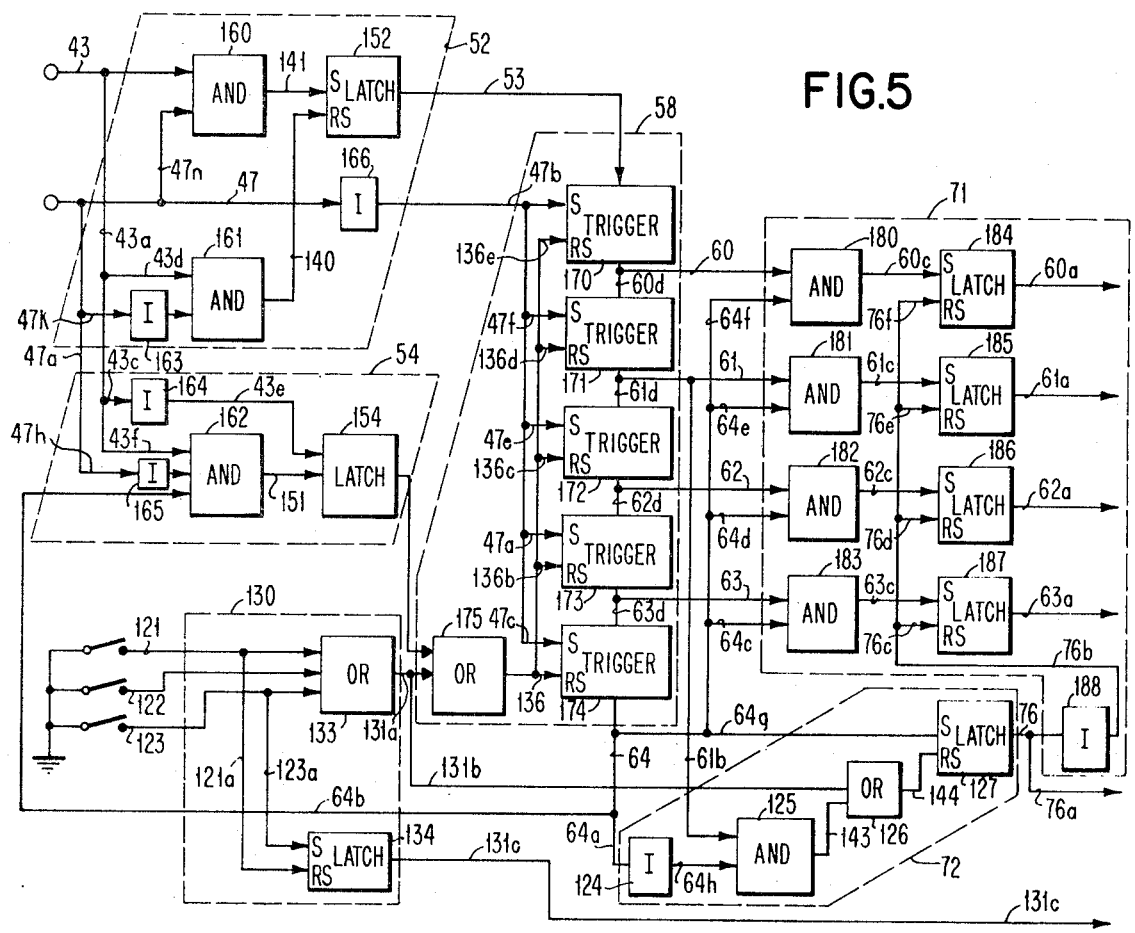
FIG. 5 is a logic diagram showing in greater detail the components of FIG. 3 for converting serially sensed card data to parallel bit characters.

Referring now to FIG. 5, a detailed description will be given of the demodulator logic 50, shift register 58, and transmit timing latch 70 of FIG. 2. The inputs to the circuit of FIG. 5 appear along line 43 from pulser 42, along line 47 from delay 46, and along lines 121 through 123 from reed switches RS1, RS2, and RS3. The output of the circuits of FIG. 5 represents the inputs to the circuit of FIG. 6 and are data bit 8 line 60a, data bit 4 line 61a, data bit 2 line 62a, data bit 1 line 63a, transmit character line 76a, and reset gate output line 131c.

Herein the circuit of FIG. 5 comprises data bit latch 52, start bit detector 54, shift register 58, character latch 71, transmit latch 72, and reset gate 130.

The latches 152, 154, 134, 127, 184, 185, 186, and 187 in FIG. 5 operate as follows: a positive going pulse on the set line causes the output to go positive and remain positive until a positive going pulse appears on the reset input line at which time the output goes negative.

The output of AND circuit 160 is fed into data latch 152 along data latch set line 141. The output of AND circuit 161 is fed into data latch 152 along data latch reset line 140. Signal f of FIG. 4 represents the output of data latch 152 which is fed into trigger 170 of the shift register 58 along line 53.

Signal c appearing on pulser output line 43 is fed into AND circuit 160, into AND circuit 161 along line 43d, into the reset position of latch 154 along line 43a, 43c, and through inverter 164 along line 43e, and into AND circuit 162 along line 43a and 43f. The window signal e appearing on delayed single shot line 47 is fed into AND circuit 160 along lines 47 and 47n, into AND circuit 161 through inverter 163 along lines 47, 47a and 47k, into AND circuit 162 through inverter 165 along lines 47a and 47h, and through inverter 166 into the set position of triggers 170 through 174 along lines 47b, 47f, 47e, 47d, and 47c, respectively. Triggers 170 through 174 operate in the following manner. For example, referring to trigger 170, a shift occurs when a positive pulse appears on set line 47b, and the zero or one logic level present on input line 53 before the shift appears on output line 60d and holds at that logic level until the next shift. When a positive level appears on reset line 136e, output line 60d goes to a zero logic level. Thus, whenever window signal e on line 47 goes negative, it is inverted by inverter 166 such that a positive going pulse appears at the set position of triggers 170 through 174, causing the input to each trigger to be transferred to its output, which is the input of the following trigger. Thus, the output of trigger 170 appears upon line 60 and 60d and represents an input to AND circuit 180 and trigger 171. The output of trigger 171 appears along line 61, 61d, 61b, and represents an input to AND circuit 181, trigger 172, and AND circuit 125. The output of trigger 172 appears along line 62, 62d, and represents an input to AND circuit 182 and trigger 173. The output of trigger 173 appears along line 63 and 63d and represents an input to AND circuit 183 and trigger 174. The output of trigger 174 appears along line 64, 64g, 64c, 64d, 64e, 64f, 64b, and 64a, and represents an input to AND circuits 180 through 183, the set position of latch 127, AND circuit 162, and through inverter 124 along line 64h to AND circuit 125 of transmit latch 72.

Within transmit latch 72, the output of AND circuit 125 appears along line 143 as one input to OR circuit 126. The other input to OR circuit 126 is along line 131b from OR circuit 133 within reset gate 130. The inputs to OR circuit 133 appear along lines 121, 122, 123, from reed switches RS1, RS2, and RS3.

The output of AND circuit 162 appears along line 151 to the set position of latch 154. The output of latch 154 appears along line 55 as an input to OR circuit 175. The output of OR circuit 175 appears along lines 36, 36b, 36c, 36d, and 36e to the reset position of triggers 174, 173, 172, 171, and 170, respectively.

The output of OR circuit 126 is fed along line 144 to the reset position of latch 127. The output of latch 127 is fed along line 76 through inverter 188 along lines 76b, 76c, 76d, 76e, and 76f, to the reset positions of latches 187, 186, 185, and 184. The set positions of latches 184 through 187 appear along lines 60c, 61c, 62c, and 63c, from AND circuits 180 through 183, respectively.

The output of reed switch RS1 is fed along lines 121 and 121a to the reset position of latch 134. The output of reed switch RS3 is fed along lines 123 and 123a to the set position 134. The output of latch 134 appears along line 131c and is fed into the character encoding logic circuit of FIG. 6.

The operation of the circuit of FIG. 5 will next be described. With any reed switch RS1 through RS3 closed, the output of OR circuit 175 is positive, resetting triggers 170 through 174 such that the output of each said trigger is a logical zero. When head 30 is at home position such that reed switch RS1 is closed, the latch 134 is reset causing a negative output along line 131c. As the head 30 is cocked, such that reed switch 123 is closed, latch 134 is set and a positive output appears along line 131c until the head travels to its home position whereupon reed switch RS1 closes causing latch 134 to reset and causing a negative output on line 131c. As will be apparent in the discussion of FIG. 6 hereafter, with line 131c positive, relay driver 262 is turned on, closing contact 264 and turning on the data set 74.

During the period that the read head is scanning the credit card between the reed switch positions, the output of OR 133 is negative, permitting the shift register 58 to operate unless reset by start bit detector 54.

In order to understand the operation of shift register 58, it is necessary to note that the circuit is designed for a five bit character comprising a start bit and four data bits. Referring to signal c, the start bit dbs' for each character is always a logical one and appears first at the input to trigger 170. During each window pulse, as line 47b goes positive, the contents of registers 170 through 173 are shifted to the following trigger. Thus, the start bit dbs' which first appeared on line 53 ripples down until it appears in trigger 174, at which time the data bit db8 appears in trigger 170, data bit db4 appears in trigger 171, data bit db2 appears in trigger 172, and data bit db1 appears in trigger 173.

During this ripple process, as the start bit appeared in trigger 171, line 61b went positive. Inasmuch as trigger 174 had previously been reset, in a manner to be explained below, its output along line 64 is negative. Thus, both inputs to AND 125 are satisfied, resetting latch 127 and 184 through 187, terminating transmission of the previous character.

Figure 6:
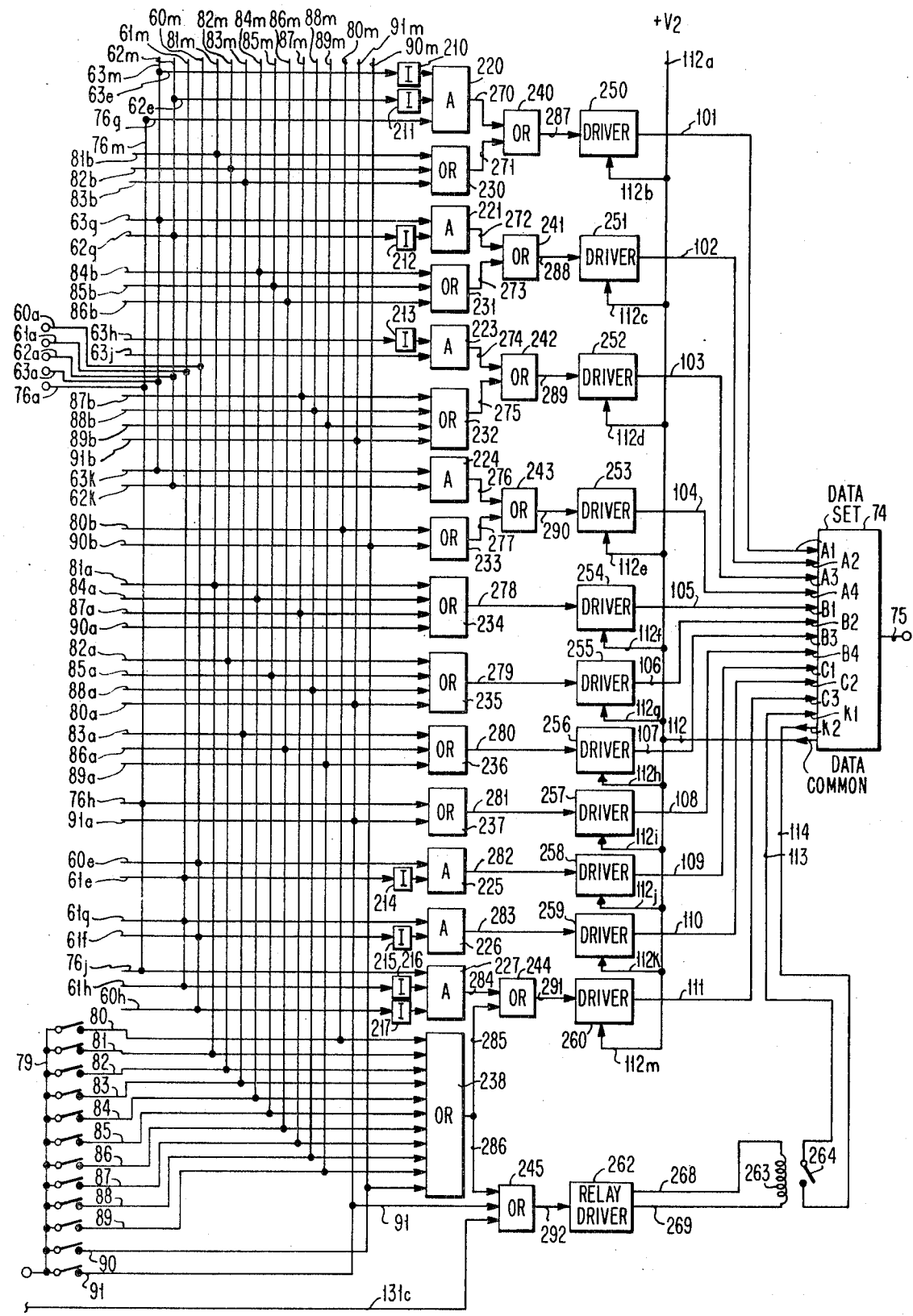
FIG. 6 is a logic diagram showing in greater detail the character encoding logic of FIG. 3 for converting keyed in data from FIG. 3 and card sensed characters of FIG. 5 into 3 of 14 tones for transmission over the telephone lines to a central computer.

When the start bit appears in trigger 174, a AND circuits 180 through 183 are satisfied for those bit positions containing a logical one resulting in the contents of triggers 170 through 173 being transferred to the set position of latches 184 through 187, whereupon the character is transmitted to the data set 74 of FIG. 6. Upon the appearance of the clock bit cb2 preceding the start bit dbs'' for the following character on line 43 coincident with the window on line 47, the output of AND circuit 162 goes positive, setting latch 154 which causes triggers 170 through 174 to be reset, such that lines 60d, 61d, 62d, 63d, and 64 go negative. However, the character had been previously transferred to latches 184 through 187, as noted above, to remain until line 61 again goes positive. Thus, with line 64a negative, one input to AND circuit, 125 is positive. As the start bit for the following character appears on line 61, AND circuit 125 is satisfied, causing latch 127 to be reset. The negative level on line 76 is inverted causing latches 184 through 187 to be reset. Thus, during the period of time beginning with the appearance of the start bit dbs' at the output of trigger 174 until the appearance of the clock bit cb2 preceding start bit dbs'' of the following character at the output of trigger 171, latches 184 through 187 present to the character encoding logic of FIG. 6 the first character along data bit lines 60a, 61a, 62a, and 63a.

It is possible to shorten the period during which latches 184 through 187 are set by moving the input to AND circuit 125 from trigger 171 to trigger 170. Similarly, it is possible to lengthen the period of time that latches 184 through 187 are set by moving the input to said AND circuit 125 from trigger 171 to trigger 172 or 173.

In order to prevent the transmission of unintelligible noise such as would appear when reed switch RS2 is closed while the head passes between identification cards, latches 184 through 187 are held in a reset mode through latch 127. During the same time, shift register 58 is held in a reset mode.

CHARACTER ENCODING LOGIC

Referring now to FIG. 6, character-encoding logic 73 will next be described. The input to character encoding logic 73 appears on data bit 8 line 60a, data bit 4 line 61a, data bit 2 line 62a, data bit 1 line 63a, transmit character line 76a, key bit 0 line 80 through key bit 9 line 89, key bit * line 90, key bit 0 line 91, and reset gate output line 131c. The output of character encoding logic 73 appears along lines 101 through 111, operating contact closures A1 through C3, and along lines 268 and 269 operating relay coil 263 which turns on the data set 74 through reed switch 264.

A positive voltage on transmit character line 76a indicates that a character of card data is to be transmitted and is fed to AND circuit 220, OR circuit 237, and AND circuit 227 along line 76m, 76g, 76h, and 76j. The logic on data bit 1 line 63a is fed to AND circuit 220 through inverter 210 along line 63e 63m, to AND circuit 221 along line 63g and 63m, to AND circuit 223 through inverter 213 along lines 63h and 63m, and to AND circuit 224 along lines 63k and 63m. The logic level on data bit 2 line 62a is fed to AND circuit 220 through inverter 211 along lines 62e and 62m, to AND circuit 221 through inverter 212 along lines 62g and 62m, to AND circuit 223 along lines 62j and 62m, and to AND circuit 224 along lines 62k and 62m. The signal on data bit 4 line 61a is fed to AND circuit 225 through inverter 214 along lines 61e and 61m, to AND circuit 226 along lines 61g and 61m, and to AND circuit 227 through inverter 216 along lines 61h and 61m. The signal on data bit 8 line 60a is sent to AND circuit 225 along lines 60e and 60m, to AND circuit 226 through inverter 215 along lines 60f and 60m, and to AND circuit 227 through inverter 217 along lines 60h and 60m.

The signal on key bit 0 line 80 is fed to OR circuit 238, and OR circuit 233 along lines 80b and 80m. The signal on key bit 1 line 81 is fed to OR circuit 238, to OR circuit 234 along lines 81a and 81m, and to OR circuit 230 along lines 81b and 81m. The signal on key bit 2 line 82 is fed to OR circuit 238, to OR circuit 235 along lines 82a and 82m, and to OR circuit 230 along lines 82b and 82m. The signal on key bit 3 line 83 is fed to OR circuit 238, to OR circuit 236 along lines 83a and 83m, and to OR circuit 230 along lines 83b and 83m. The signal on key bit 4 line 84 is fed to OR circuit 238, to OR circuit 234 along lines 84a and 84m, and to OR circuit 231 along lines 84b and 84m. The signal on key bit 5 line 85 is fed to OR circuit 238, to OR circuit 239 along lines 85a and 85m, and to OR circuit 231 along lines 85b and 85m. The signal on key bit 6 line 86 is fed to OR circuit 238, to OR circuit 236 along lines 86a and 86m, and to OR circuit 231 along lines 86b and 86m. The signal on key bit 7 line 87 is fed to OR circuit 238, to OR circuit 234 along lines 87a and 87m, and to OR circuit 232 along lines 87b and 87m. The signal on key bit 8 line 88 is fed to OR circuit 238, to OR circuit 235 along lines 88a and 88m, and to OR circuit 232 along lines 88b and 88m. The signal on key bit 9 line 89 is fed to OR circuit 286, to OR circuit 236 along lines 89a and 89m, and to OR circuit 232 along lines 89b and 89m. The signal on key bit * line 90 is fed to OR circuit 238, to OR circuit 233 along lines 90b and 90m, and to OR circuit 234 along lines 90a and 90m. The signal on key bit 0 line 91 is fed to OR circuit 245, to OR circuit 237 along lines 91a and 91m, and to OR circuit 232 along lines 91b and 91m. The signal on key bit 0 line 80 is also fed to OR circuit 235 along lines 80a and 80m.

The output of OR circuit 238 is fed along line 286 to OR circuit 245. The other inputs to OR circuit 245 are key bit 0 on line 91 and the reset line 131c from latch 134 in reset gate 130. Thus, with any key depressed or head 30 returning to home position in a data scan across cards 22 and 23, the output of OR circuit 245 is positive, turning on relay driver 262 which sends a current through relay coil 263 along lines 268 and 269. With current flowing through coil 263, key 264 is closed, turning on the data set 74 by permitting current to flow from key K2 along lines 114 to key K1 along line 113. With current flowing through contact closures K1 and K2, the data set is on and an electrical tone signal will appear on line 75. The tone transmitted on line 75 is determined by drivers 250 through 260 as will be hereafter explained. In the event that all drivers 250 through 260 are open, while switch 264 is closed, a rest tone, as distinguished from a data or combination of data tones, will be transmitted.

The output of AND circuit 220 is fed along line 270 to OR circuit 240. The other input to OR circuit 240 is along line 271 from OR circuit 230. The output of OR circuit 240 is fed along line 287 to driver 250. Driver 250 (and similarly drivers 251 through 260) is the electronic equivalent of a mechanical switch, in that with a positive logic level on line 287, driver 250 permits current to flow between line 101 and 112 to key A1. The purpose of voltage V2 is to bias the drivers 250 through 260 off when the input goes negative, to prevent leakage current in the driver output.

The output of AND circuit 221 is fed along line 272 to OR circuit 241 as is the output of OR circuit 231 along line 273. The output of OR circuit 241 is fed to driver 251 along line 288. With the positive voltage on line 288, driver 251 turns on key A2 of data set 74 along line 102.

The output of AND circuit 223 and of OR circuit 232 are fed along lines 274 and 275, respectively, to OR circuit 242. With either input to OR circuit 242 positive, a positive level appears on line 289 enabling driver 252, the output of which is fed along 103 to contact A3 in data set 74.

The output of AND circuit 224 and of OR circuit 233 are fed along lines 276 and 277, respectively, to OR circuit 243. With the positive level appearing at either input to OR 243, an output signal on line 290 enables driver 253, the output of which is fed along line 104 to contact closure A4 in data set 74.

The output of OR circuit 234 is fed along line 278 to driver 254. With driver 254 enabled, key contact B1 in data set 74 is enabled along line 105.

The output of OR circuit 235 is fed along line 279 to driver 255. With driver 255 enabled, key contact B2 in data set 74 is enabled along line 106.

The output of OR circuit 236 is fed along line 280 to driver 256 which signals closure B3 of data set 74 along line 107.

The output of OR circuit 237 is fed along line 281 to driver 257 which signals contact closure B4 of data set 74 along line 108.

The output of AND circuit 225 is fed along line 282 to driver 258 which signals contact closure C1 in data set 74 along line 109.

The output of AND circuit 226 is fed along line 283 to driver 259 which, when signals contact closure C2 in data set 74 along line 110.

The output of AND circuit 272 and of OR circuit 238 are fed along lines 284 and 285, respectively, to OR circuit 244. The output of OR circuit 244 is fed along line 291 to driver 260 which signals contact closure C3 in data set 74 along line 111.

The following table illustrates the keys of data set 74 which are turned on by the indicated card-sensed character along lines 60a through 63a.

TABLE 1.—CARD DATA TRANSMISSION CODES

| Card Data Input Lines | | | | Tone Keys Activated for Transmission | | | | | | | | | | |
|---|---|---|---|---|---|---|---|---|---|---|---|---|---|---|
| 60a | 61a | 62a | 63a | | | | | | | | | | | |
| Data Bit Value | | | | A1 | A2 | A3 | A4 | B1 | B2 | B3 | B4 | C1 | C2 | C3 |
| 8 | 4 | 2 | 1 | | | | | | | | | | | |
| 0 | 0 | 0 | 0 | X | | | | | | | X | | | X |
| 0 | 0 | 0 | 1 | | X | | | | | | X | | | X |
| 0 | 0 | 1 | 0 | | | X | | | | | X | | | X |
| 0 | 0 | 1 | 1 | | | | X | | | | X | | | X |
| 0 | 1 | 0 | 0 | X | | | | | | | X | | X | |
| 0 | 1 | 0 | 1 | | X | | | | | | X | | X | |
| 0 | 1 | 1 | 0 | | | X | | | | | X | | X | |
| 0 | 1 | 1 | 1 | | | | X | | | | X | | X | |
| 1 | 0 | 0 | 0 | X | | | | | | | X | X | | |
| 1 | 0 | 0 | 1 | | X | | | | | | X | X | | |
| 1 | 0 | 1 | 0 | | | X | | | | | X | X | | |
| 1 | 0 | 1 | 1 | | | | X | | | | X | X | | |
| 1 | 1 | 0 | 0 | X | | | | | | | X | | | |
| 1 | 1 | 0 | 1 | | X | | | | | | X | | | |
| 1 | 1 | 1 | 0 | | | X | | | | | X | | | |
| 1 | 1 | 1 | 1 | | | | X | | | | X | | | |

The following table illustrates the keys of data set 74 which are activated for various input conditions along lines 80 through 91:

TABLE 2.—KEY DATA TRANSMISSION CODES

| | Tone Keys Activated for Transmission | | | | | | | | | |
|---|---|---|---|---|---|---|---|---|---|---|
| | A1 | A2 | A3 | A4 | B1 | B2 | B3 | B4 | C1 | C2 | C3 |
| Key Actuated: | | | | | | | | | | | |
| K0 | | | | X | | X | | | | | X |
| K1 | X | | | | X | | | | | | X |
| K2 | X | | | | | X | | | | | X |
| K3 | X | | | | | | X | | | | X |
| K4 | | X | | | X | | | | | | X |
| K5 | | X | | | | X | | | | | X |
| K6 | | X | | | | | X | | | | X |
| K7 | | | X | | X | | | | | | X |
| K8 | | | X | | | X | | | | | X |
| K9 | | | X | | | | X | | | | X |
| K* | | | | X | X | | | | | | X |
| K# | | | | X | | | X | | | | X |

As a result of the character encoding logic described above in FIG. 6, and by way of illustration of the above Tables, depression of key K0 will cause transmission along line 75 of that frequency generated through key contacts A4, B2, and C3 of data set 74.

Similarly, closure of key K1 in keyboard 11 causes transmission of those tones associated with contacts A1, B1, and C3 of data set 74. The closure of key K2 causes transmission of those tones associated with key contacts A1, B2, and C3. Also, the character 1010 from card sensed data will cause transmission of tones A3, B4, and C1. This occurs when lines 60a and 62a are positive and 76a, 61a and 63a are negative.

While the invention has been particularly shown and described with reference to a preferred embodiment thereof, it will be understood by those skilled in the art that the foregoing and other changes in form and details may be made therein without departing from the spirit and scope of the invention.

We claim:
1. A terminal apparatus for transmitting data to a central processor comprising:
a first identification card carrying a magnetic stripe having encoded in said stripe identification data in two modes;

carriage means for mounting a magnetic transducer oriented so as to sense data on said first identification card in only one of said two modes;

a second identification card carrying a magnetic stripe having identification data encoded in said second stripe in said one mode readable by said transducer;

means for holding said cards with their respective stripes colinear;

means for causing relative motion between said transducer and said stripes whereby the transducer serially senses the magnetic data encoded in said one mode in said stripes, means for transmitting said sensed information to said central processor.

2. The apparatus of claim 1 further including keyboard means for transmitting transaction data.

3. The apparatus of claim 2 further including means for identifying to the computer whether the data being transferred is from the magnetic identification card or the keyboard.

4. The apparatus of claim 3 wherein said identifying means comprises encoding means for encoding magnetic card sense data in a different code from that for keyboard data whereby the terminal operator may not key in identification data.

5. The apparatus of claim 1 wherein said two modes comprise a first mode of identification data recorded in (f/2f) saturation recording at −5° from a line in the plane of the magnetic stripe perpendicular to the longitudinal axis of said stripe and a second mode also recorded in (f/2f) saturation recording at 45° with respect to said line.

6. The apparatus of claim 5 wherein the identification data recorded in said magnetic stripe in said second mode is contained within a first track and wherein the identification data recorded in said first mode is recorded in a second track, said first track and said second track having colinear longitudinal axis and wherein said first track is narrower than said second track.

7. The apparatus of claim 1 further including the reed switch gating means for permitting transmission of data sensed by said magnetic transducer only when said transducer is scanning the data area of said magnetic tracks.

8. The apparatus of claim 7 wherein said identification cards are held stationary and wherein said means for causing said relative motion causes motion of said carriage means.

9. The apparatus of claim 1 further including means for encoding the information serially sensed from said magnetic stripe into a multiple tone code for transmission of multibit characters.

10. A terminal for transmitting identification and transaction data to a central location comprising:

a keyboard means for entering transaction data;

a first identification card carrying a magnetic stripe serially encoded with identification data;

a second identification card carrying a magnetic stripe serially encoded with further identification data;

carriage means for mounting a magnetic transducer oriented so as to sense the identification data in said magnetic stripes;

means for causing relative motion between said transducer and said stripes whereby the transducer serially senses the magnetic data encoded in said stripes;

means for transmitting said sensed information to said central location;

encoding means for encoding said identification data into a first multitone code and said keyboard data into a second multitone code different from said first multitone code whereby the terminal operator may not key in identification data;

reed switch gating means for permitting transmission of data sensed by said magnetic transducer only when said transducer is scanning the data containing areas of said stripe; and whereby customer and location identification data and variable transaction data may be transmitted to a central location for credit authorization.

11. A terminal apparatus for transmitting data to a central processor comprising:

first identification card means having data encoded in a magnetic stripe;

second identification card means having data encoded in a second magnetic stripe;

a magnetic transducer for sensing the data in said magnetic stripes;

means for holding said cards with their respective magnetic stripes colinear;

means for causing relative motion between said transducer and said cards whereby the data encoded in said stripes is serially sensed, keyboard means for entering data;

encoding means for encoding data from said keyboard and data sensed from said stripes in different multitone characters; and means for transmitting said multitone characters to said central processor.